United States Patent
Lewis

(10) Patent No.: US 9,110,744 B2
(45) Date of Patent: Aug. 18, 2015

(54) SECURE APPLICATION FIRMWARE ENVIRONMENT FOR X86 AND NON-X86 PROCESSORS

(75) Inventor: Timothy A. Lewis, El Dorado Hills, CA (US)

(73) Assignee: Phoenix Technologies Ltd., Campbell, CA (US)

( * ) Notice: Subject to any disclaimer, the term of this patent is extended or adjusted under 35 U.S.C. 154(b) by 729 days.

(21) Appl. No.: 13/224,662

(22) Filed: Sep. 2, 2011

(65) Prior Publication Data

US 2013/0061242 A1 Mar. 7, 2013

(51) Int. Cl.
- *G06F 9/44* (2006.01)
- *G06F 9/46* (2006.01)
- *G06F 13/00* (2006.01)
- *G06F 9/54* (2006.01)
- *G06F 9/455* (2006.01)

(52) U.S. Cl.
CPC .............. *G06F 9/545* (2013.01); *G06F 9/4411* (2013.01); *G06F 9/455* (2013.01)

(58) Field of Classification Search
CPC ........ G06F 9/455; G06F 9/545; G06F 9/4411
See application file for complete search history.

(56) References Cited

U.S. PATENT DOCUMENTS

| 5,796,984 | A | * | 8/1998 | Pearce et al. | 703/24 |
| 6,106,565 | A | * | 8/2000 | Stapleton et al. | 703/23 |
| 2007/0016766 | A1 | * | 1/2007 | Richmond et al. | 713/100 |
| 2009/0204785 | A1 | * | 8/2009 | Yates et al. | 711/205 |

OTHER PUBLICATIONS

ARM Security Technology—Building a Secure System usingTrustZone® Technology; Apr. 2009; 108 pages.*

* cited by examiner

*Primary Examiner* — H S Sough
*Assistant Examiner* — Kimberly Jordan
(74) *Attorney, Agent, or Firm* — Brokaw Patent Law PC; Christopher J. Brokaw

(57) ABSTRACT

Techniques for firmware providing a simulated system management mode (SMM) while being executed by a non-x86 platform, such as an ARM platform. In response to receiving a service call from an OS interface driver, the firmware may determine a requested service identified by the service call. Thereafter, the firmware may identify an appropriate service handler to perform the requested service. After the appropriate service handler performs the requested service, the appropriate service handler notifies the OS interface driver. Since the SMM is emulated by the firmware, the firmware may execute on an x86 platform or a non-x86 platform, such as an ARM platform.

17 Claims, 9 Drawing Sheets

SAFE CORE SERVICES

*210*

| Name | Size (in bytes) | Offset | Description |
|---|---|---|---|
| SubFn | 4 | 0 | An unsigned integer that specifies the SAFE Core Services sub-function. The value here determines the format of any additional data in the Service Parameter Buffer |
| Initialize() Entry Service Buffer Format: | | | |
| SubFn | 4 | 0 | 0 (Initialize) |
| ValidationSize | 4 | 4 | An unsigned integer that specifies the size of the validation information |
| ValidationPtr | 8 | 8 | A pointer to the first byte of the validation information |
| ValidationType | 16 | 16 | A GUID that specifies the type of validation information |
| Initialize() Exit Service Buffer Format: | | | |
| Status | 8 | 0 | A SCT status code that indicates the result of the operation |
| Shutdown() Entry Service Buffer Format: | | | |
| SubFn | 4 | 0 | 1 (Shutdown) |
| Shutdown() Entry Service Buffer Format: | | | |
| Status | 8 | 0 | A SCT status code that indicates the result of the operation |
| Query() Entry Service Buffer Format: | | | |
| SubFn | 4 | 0 | 2 (Query) |
| ServiceGUID | 16 | 4 | A Service GUID |
| Query() Entry Service Buffer Format: | | | |
| Status | 8 | 0 | A SCT status code that indicates the result of the operation |

FIG. 2A

SAFE TIMER SERVICES

220

| Name | Size (in bytes) | Offset | Description |
|---|---|---|---|
| SubFn | 4 | 0 | An unsigned integer that specifies the SAFE Core Services sub-function. The value here determines the format of any additional data in the Service Parameter Buffer |
| Notify() Entry Service Buffer Format: | | | |
| SubFn | 4 | 0 | 0 (Notify) |
| ElapsedTime | 8 | 4 | An unsigned integer that specifies the amount of time elapsed since the last notification in 100ns units. A value of 0 indicates an unknown amount of time |
| Notify() Entry Service Buffer Format: | | | |
| Status | 8 | 0 | A SCT status code that indicates the result of the operation |
| NextTime | 8 | 8 | An unsigned integer that indicates the minimum amount of time that must elapse before the next notification |

FIG. 2B

SAFE SYSTEM STATE SERVICES

230

| Name | Size (in bytes) | Offset | Description |
|---|---|---|---|
| SubFn | 4 | 0 | An unsigned integer that specifies the SAFE Core Services sub-function. The value here determines the format of any additional data in the Service Parameter Buffer |
| Notify() Entry Service Buffer Format: | | | |
| SubFn | 4 | 0 | 0 (Notify) |
| SleepType | 4 | 4 | An unsigned integer that specifies the sleep state being entered or exited. 0=S0, 1=S1, etc. |
| SleepPhase | 4 | 8 | An unsigned integer that specifies whether the state is being entered (0) or exited (1) |
| Notify() Entry Service Buffer Format: | | | |
| Status | 8 | 0 | A SCT status code that indicates the result of the operation |

FIG. 2C

SAFE ACPI TABLE

| Field | Byte | Offset | Description |
|---|---|---|---|
| Header Signature | 4 | 0 | 'SAFE' (0x45464153). Signature for the SAFE communication table. |
| Length | 4 | 4 | Length, in bytes, of the entire table |
| Revision | 1 | 8 | 1 |
| Checksum | 1 | 9 | Entire table must sum to zero. |
| OEMID | 6 | 10 | OEM ID. |
| OEM Table ID | 8 | 16 | For the UEFI Table, the table ID is the manufacture model ID. |
| OEM Revision | 4 | 24 | OEM revision of UEFI table for supplied OEM Table ID. |
| Creator ID | 4 | 28 | Vendor ID of utility that created the table. |
| Creator Revision | 4 | 32 | Revision of utility that created the table. |
| EntryPoint | 8 | 36 | The logical address of the SAFE entry point. |
| ParmBufferOffset | 2 | 44 | Specifies the byte offset to the parameter buffer within this table, relative to the start of the table header. |
| ... | X | 46 | Reserved for future expansion. |
| ParmBufferSessionId | 4 | 46 + X | Unique session identifier incremented by the OS interface driver. |
| ParmBufferSize | 4 | 46 + X + 4 | |
| ParmBufferGuid | 16 | 46 + X + 8 | GUID that specifies the target SAFE handler. Also corresponds to the SMI Target in the PI specification. |
| ParmBuffer | Y (512) | 46 + X + 24 | A buffer of at least 512 bytes used for passing data to and from the SAFE services. |

Specification Fields ⇐

610

Extended Fields ⇒

SECURE APPLICATION FIRMWARE ENVIRONMENT FOR X86 AND NON-X86 PROCESSORS

FIELD OF THE INVENTION

The present invention relates to approaches for firmware that is capable of providing a set of services regardless of whether the firmware is on a x86 platform or a non-x86 platform, such as an ARM processor.

BACKGROUND OF THE INVENTION

A central processing unit (CPU), or simply "a processor," is a hardware component of a computer system responsible for carrying out the instructions of a computer program. Two types of processors are ARM processors and x86 processors. ARM processors have a relatively simple architecture which makes them suitable for low power applications. As a result, ARM processors have become the dominant processor in the mobile and embedded electronics market. The term x86 refers to a family of instruction set architectures based on the Intel 8086 CPU. X86 processors are more suitable for higher power environments and are widely used in modern PCs.

A distinction between ARM processors and x86 processors is that x86 processors possess a system management mode (SMM) while ARM processors do not. The SMM is a special operating mode that is reserved for firmware. The SMM is used by firmware to perform certain functions is a secure manner without the possibility of interference by the operating system or an application.

There are a variety of ways in which applications may interact with or engage the services of the firmware while an operating system is running. One way involves the use of legacy x86 real-mode interfaces. Legacy x86 real-mode interfaces were introduced with the IBM PC in 1980 and use the x86 software interrupt instruction (INT) to force the CPU to jump to a pre-defined address which identifies an entry point into the firmware. Parameters may be passed between the application and the firmware using CPU registers or buffers. Unfortunately, legacy x86 real mode interfaces do not exist on non-x86 (e.g., ARM) platforms. Further, legacy x86 real-mode interfaces are not supported on some x86 firmware implementations, such as pure UEFI. Legacy x86 real-mode interfaces also have the limitation that memory above 1 MB cannot be accessed.

Another way for applications to interact with or engage the services of the firmware is through an implementation of the UEFI specification. The UEFI specification defines a class of drivers called 'runtime' which indicates that the drivers (and the services they provide) persist while the operating system is running. In addition, UEFI itself provides a runtime services table which exposes services and data provided by the system firmware. The EFI system configuration table is an extensible, searchable data structure pointed to by this table and which is often used to provide the address of runtime services to OS applications and drivers. However, UEFI interfaces cannot be supported on non-UEFI firmware or with non-UEFI operating systems (e.g., DOS, WinXP, and some Linux distributions). UEFI runtime also does not provide memory management, synchronization, or service discovery facilities.

Applications may also interact with or engage the services of the firmware via a System Management Interrupt (SMI). On many x86 platforms, write operations directed to specific I/O ports or memory-mapped I/O locations will generate a SMI. On detection of the SMI, all CPU cores switch into System Management Mode (SMM) and begin execution at a pre-defined address. The actual value written to the port is typically used as a function code that specifies the type of system firmware service to be invoked. Additional parameters may be passed in CPU registers, other ports, or through a memory buffer. However, SMI and SMM do not exist on ARM platforms. SMM cannot be provided by ARM platforms without additional hardware support from the chipset or the CPU.

Another way in which applications may interact with or engage the services of the firmware involves an implementation of the ACPI specification. The ACPI specification describes a pseudo-machine language (AML) which may be interpreted by many operating systems to provide additional functionality. AML is provided by the system firmware. However, AML has limited access to the hardware. In general, AML only has access to the hardware resources that have been exposed to the operating system. Many implementations also have performance problems.

Applications may also interact with or engage the services of the firmware using a customized operating system (OS) driver. In the customized OS driver approach, rather than using the firmware at all, each OS driver is specifically crafted for each supported operating system so that the customized OS driver contains the necessary functionality for that operating system. Naturally, this approach requires a separate implementation for each operating system and each hardware platform, which is quite time consuming and costly. Further, such customized OS drivers would not have access to firmware configuration data, such as setup options.

Use of a proprietary OS driver/firmware interface may also be used to allow an application to interact with or engage the services of the firmware. Using a proprietary OS driver/firmware interface is similar to using a customized OS driver, except that the firmware service discovery, invocation, parameter passing, and environment are proprietary. The entry point for the services provided by the firmware may be hard-coded, found by looking for a pre-defined signature, or passed via some custom discoverable table. This approach has the disadvantage of being more difficult to understand and transfer to new engineers. In addition, it is more difficult to adapt other third party firmware code to use a proprietary OS driver/firmware interface.

Discussion in this section is meant to provide an understanding of prior approaches to the reader as they relate to embodiments of the invention. However, the disadvantages of prior approaches discussed in this section are not meant to be an admission that such disadvantages were publically known. Consequently, recognition of the disadvantages of the prior art discussed herein is not meant to be construed as being within the prior art simply by virtue of its inclusion in this section alone.

SUMMARY OF THE INVENTION

Advantageously, embodiments of the invention enable system firmware services to be utilized from within an operating system on x86 and non-x86 processors. Embodiments of the invention create an execution environment (denoted SAFE) that mimics many of the attributes of the System Management Mode (SMM) found on X86 CPUs on CPUs and platforms that do not support SMM.

In an embodiment, firmware provides a simulated system management mode (SMM) while being executed by one or more ARM processors. In response to receiving a service call from an OS interface driver, the firmware may determine a requested service identified by the service call. Thereafter, the firmware may identify an appropriate service handler to perform the requested service. After the appropriate service handler performs the requested service, the appropriate service handler notifies the OS interface driver. Since the SMM is emulated by the firmware, the firmware may execute on a x86 platform or a non-x86 platform, such as an ARM platform, without modifying the source code.

The approaches described herein are not meant to describe all the embodiments of the invention, as other embodiments of the invention may differ in their operation compared to the illustrative approaches discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 2A is a table that illustrates size, offset, and description information for certain exemplary core services provided by SAFE according to an embodiment;

FIG. 2B is a table that illustrates size, offset, and description information for certain exemplary SAFE timer services provided by SAFE according to an embodiment;

FIG. 2C is a table that illustrates size, offset, and description information for certain exemplary SAFE system state services provided by SAFE according to an embodiment;

FIG. 6 is a depiction of an exemplary SAFE ACPI table according to an embodiment of the invention.

DETAILED DESCRIPTION OF THE INVENTION

Figure 1:
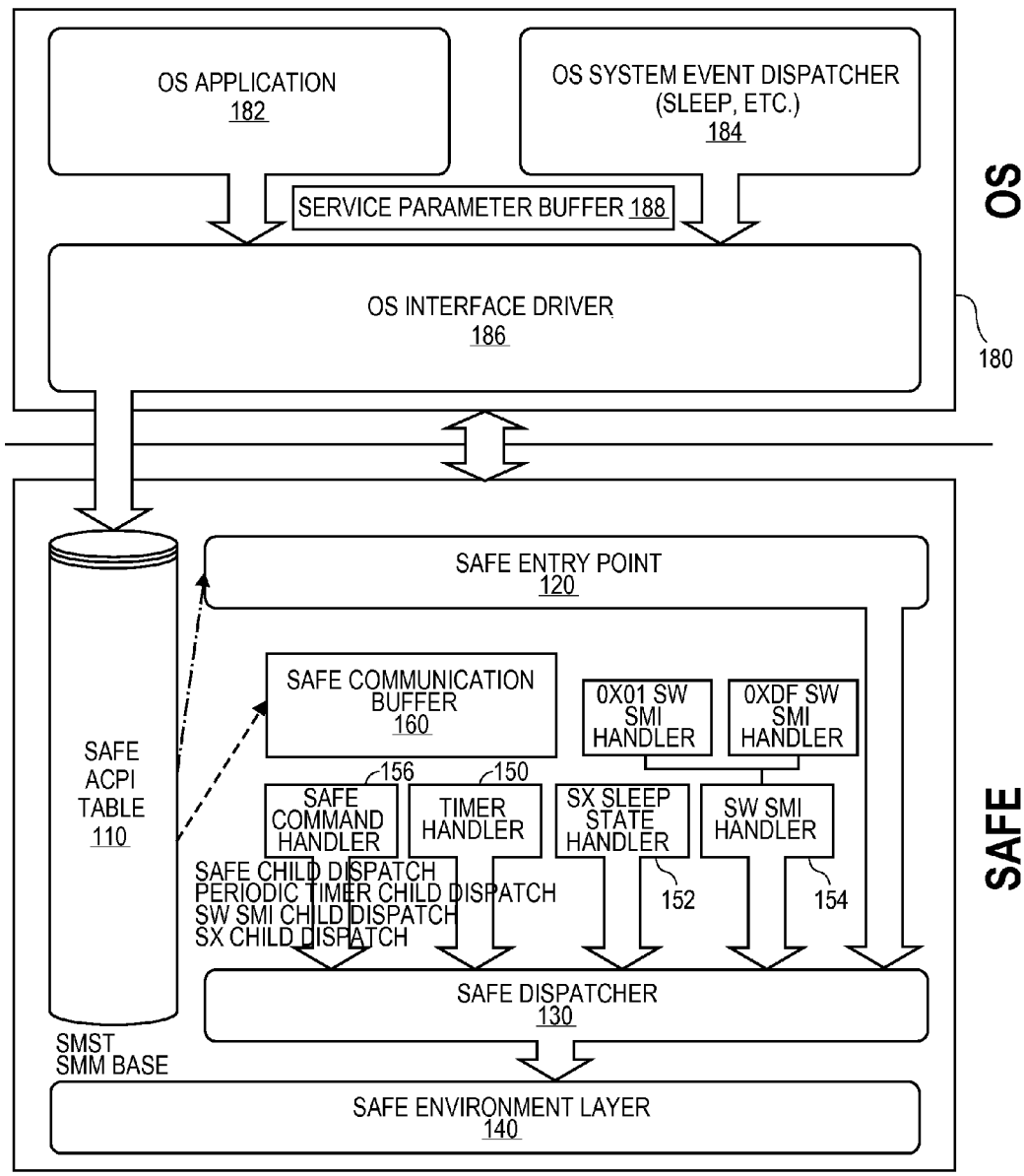
FIG. 1 is an illustration of the Secure Application Firmware Environment (SAFE) according to an embodiment of the invention.

Approaches for firmware to provide a simulated system management mode (SMM) while being executed by a non-x86 platform are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

System Management Mode

Embodiments of the invention create an execution environment (Secure Application Firmware Environment or simply "SAFE") that mimics many of the attributes of the System Management Mode (SMM) found on X86 CPUs on CPUs and platforms that do not support SMM. Prior to discussing the SAFE according to an embodiment, it will be helpful to review System Management Mode (SMM), as the SAFE may emulate a SMM on non-x86 platforms. In today's PC, the x86 architecture supports a System Management Mode (SMM). This execution mode is distinct from the other execution modes, such as real mode or protected mode. SMM has several characteristics which make it useful for managing platforms and providing services. These characteristics of SMM are discussed below.

SMM provides a private and secure execution space. In most x86 implementations, upon assertion of a system management interrupt (SMI) and prior to entry into SMM, a separate memory address space (SMRAM) is exposed which is normally hidden (no read or write access is provided outside of SMM). In many implementations, direct memory access (DMA) activity cannot terminate in this address space. These characteristics make the execution space ideal for firmware services because it cannot be corrupted by OS software, and as a result, firmware secrets, such as keys, can be stored there securely.

SMM may be entered using a standard invocation method, such as a software system management interrupt (SMI). Typically, this involves writing a value to an I/O port. Some platforms may also have other means for entering SMM, but such ways to enter SMM are not used to provide firmware services. Consequently, to obtain firmware services via a SMM, an operating system can expect to use a standard invocation method to invoke SMM.

Firmware services that are provided in SMM can support all operating systems. As a result, firmware services need only be written once in the firmware to support multiple types of operating systems. For this reason, services provided by SMM are said to be OS-independent. Since the firmware is already closely tied to the individual platform design, the same development team that designs the firmware can also handle the customizations required for these services. Finally, since the functionality for providing the firmware services actually resides within the firmware, the firmware services are part and parcel with the hardware platform and do not require an installation disk.

By providing firmware services in SMM, firmware services can assist in chipset/platform bug-fixes, since certain critical system events (such as state transitions), may be captured.

Firmware services provided by SMM may also be used to synchronize multiple CPU cores of a computer system. Upon assertion of a SMI in a x86 platform, all CPU cores enter into SMM. This can have performance implications as all CPU resources will be used for the time between SMI assertion and SMI de-assertion. However, having only a single CPU core active during SMM is highly advantageous as doing so eliminates the potential of conflict for various hardware resources and prevents reentrancy problems.

Advantageously, embodiments of the invention provide a common execution environment for firmware services, even on platform (such as the ARM platform) where the above-discussed characteristics of SMM are optional, not present, or supported by non-standard hardware.

Secure Application Firmware Environment Overview

FIG. 1 is an illustration of the Secure Application Firmware Environment (SAFE) 100 according to an embodiment of the invention. SAFE 100 may be used by embodiments to provide a secure environment to firmware to provide firmware services in non-x86 platforms. Advantageously, SAFE 100 may support both x86 and non-86 platforms in embodiments of the invention. In an embodiment, SAFE 100 comprises SAFE ACPI table 110, SAFE entry point 120, SAFE dispatcher 130, SAFE environment layer 140, SAFE dispatchers 150-156, and SAFE communications buffer 160, each of which shall be discussed separately below.

FIG. 1 also depicts operating system (OS) 180. Non-limiting, illustrative examples of OS 180 include Android, Linux, Windows, and DOS. OS 180, or particular components comprised therein, may request the use of certain services provided by SAFE 100.

OS 180 may include a plurality of functional components, e.g., FIG. 1 depicts OS 180 as comprising OS application 182, OS system event dispatcher 182, OS interface driver 186, and service parameter buffer 188. The functional components of OS 180 depicted in FIG. 1 are illustrative of some embodiments, but in other embodiments SAFE 100 may work with an operating system which differs in implementation than OS 180 depicted in FIG. 1. It is perfectly feasible for all of the OS elements (OS application 182, OS system event dispatcher 184, and OS interface driver 186) to be combined in various ways, depending on the exact architecture and level of service provided by the operating system in which OS application 182 is running. For example, in DOS, where there is no true driver interface or events dispatcher, these might all be combined with the OS application.

OS application 182 represents a native operating systems application that uses the runtime services provided by SAFE 100. For example, certain OEMs may provide an OS application 182 that is responsible for checking the status of the battery or reporting the temperature of a hardware component. The exact binding between OS application 182 and OS interface driver 186 is specific to the particular type of OS 180, but generally such binding includes initializing the application session and sending a SAFE command. For simplicity, only one OS application 182 is depicted in FIG. 1; however, OS 180 may comprise any number of OS applications.

OS system event dispatcher 184 represents one or more OS entities that control the system state (such as shutdown, reset, and sleep) and timer notifications. The timer notifications controlled by OS system event dispatcher 184 mimic notifications provided by hardware on x86 platforms. For example, OS system event dispatcher 184 may enable interested parties to register with the OS system event dispatcher 184 to be notified when certain events (such as a change in system state) happen.

OS interface driver 186 is responsible for managing the communication between OS application 182 and SAFE 100, registering for notification of system events with OS system event dispatcher 184, and synchronizing CPU cores as required.

Service parameter buffer 188 is a buffer or location in memory for storing parameters associated with individual SAFE service calls that are initiated by OS 180, or components thereof, to SAFE 100.

With respect to the components of SAFE 100, SAFE ACPI table 110 is a table which starts with the System Description Table structure described in the ACPI specification. SAFE ACPI table 110 contains the address of SAFE entry point 120 and SAFE communication buffer 160. SAFE ACPI table 110 informs OS interface driver 186 with how to request a service from the firmware, how to pass information along with the request for service, and how to receive information from the firmware.

FIG. 6 is a depiction 600 of an exemplary SAFE ACPI table 110 according to an embodiment of the invention. FIG. 6 illustrates the signature and format of fields of an embodiment of SAFE ACPI table 110. The first nine fields depicted in FIG. 6 (Header Signature to Creator Revision) correspond to standard fields described by the ACPI specification. The remaining fields (EntryPoint to ParmBuffer) correspond to extended fields utilized by embodiments of SAFE 100. Note that FIG. 6 depicts but one way in which SAFE ACPI table 110 may be implemented, as those skilled in the art will appreciate that the structure of SAFE ACPI table 110 may vary based on the needs of the implementation of SAFE 100.

SAFE entry point 120 is the execution address which is invoked by OS interface driver 186. SAFE entry point 120 may correspond to the address of SAFE dispatcher 130 or may point to another entity that is responsible for making the SAFE 100 environment visible and responsible for calling SAFE dispatcher 130. SAFE entry point 120 is a mechanism that enables OS interface driver 186 to be informed of how to call SAFE dispatcher 130. Note that FIG. 6 depicts an illustrative SAFE entry point 120 in field 610.

SAFE dispatcher 130 is a driver that is responsible for initializing SAFE 100, handling registration of SAFE service handlers 150-158, and dispatching to SAFE service handlers 150-158 based on the contents of SAFE communication buffer 160. SAFE dispatcher 130 produces the SAFE child dispatch protocol (for registering SAFE service handlers 150-158), the SW SMI child dispatch protocol, the Sx child dispatch protocol, and the Periodic Timer child dispatch protocol.

In an embodiment, SAFE environment layer 140 corresponds to an emulated SMM environment via the production of the protocols and tables specified in either the UEFI PI specification OR the Intel Framework SMM specification. These include the SMM CPU I/O, SMM PCI, SMM Base, SMM Configuration, SMM Communication and the SMST. SAFE environment layer 140 functions as a set of APIs which may be called by SMM firmware to allow the SMM firmware to operate on an a non-x86 platform, such as an ARM-based platform.

SAFE service handlers 150, 152, 154, and 156 are registered by drivers to handle certain classes of SAFE service calls. Each SAFE service handler is one or more software components design to perform a particular service. For example, SAFE service handler 150 is responsible for performing timing functionality, SAFE service handler 152 is responsible for performing Sx sleep state functionality, SAFE service handler 154 is responsible for processing system management interrupts (SMIs), and SAFE service handler 156 is responsible for performing OEM specific SAFE commands, such as functions related to SAFE child dispatch, period timer child dispatch, SMI child dispatch, and Sx child dispatch. Those in the art shall appreciate that the particular SAFE service handlers depicted in FIG. 1 are exemplary, as other embodiments may comprise a set of SAFE service handlers that differs from those depicted in FIG. 1.

SAFE communication buffer 160 is a buffer or portion of memory that is used by SAFE dispatcher 130 when dispatching to SAFE service handlers 150-156. In an embodiment, OS interface driver 186 populates data within SAFE communication buffer 160 from data stored within service parameter buffer 188.

Having described certain components of SAFE 100 of an embodiment, approaches for requesting services provided by SAFE 100 a shall now be explained in further detail.

Safe Service Calls

Each SAFE service call may have one or more attributes. A SAFE service call may specify a service GUID, which is a unique identifier that specifies the type of function being called. The service GUID may be used by SAFE dispatcher 130 to determine which SAFE service handler 150-156 to call to handle the SAFE service call.

A SAFE service call may also specify a location in service parameter buffer 188 used to store information about the SAFE service call. The service GUID for the SAFE service call determines the format of data for the SAFE service call in service parameter buffer 188. On entry to SAFE 100, data in service parameter buffer 188 specifies service parameters for the SAFE service call. On exit from SAFE 100, data in service parameter buffer 188 indicates the return values for the SAFE service call.

A SAFE service call may also specify a service parameter buffer size for data stored in service parameter buffer 188 that describes the SAFE service call. On entry to SAFE 100, the service parameter buffer size specifies the size of the parameter data in service parameter buffer 188. The size may be expressed in bytes. On exit from SAFE 100, the service parameter buffer size indicates the size of the return value data in service parameter buffer 188.

A SAFE service call may also specify a session identifier (or simply a 'session id'). The session id is a security measure designed to guard against other drivers attempting to use the same interface. The session id may be implemented as an unsigned integer which is incremented before each service call. SAFE dispatcher 130 may verify the session id before invoking any one of SAFE service handlers 150-156. OS interface driver 186 records the session id after invoking each SAFE service handler and zeroes this field in SAFE communication buffer 160.

A SAFE service call may also specify a synchronize CPU cores attribute. This attribute (which may be tied to the service GUID by convention) may be used as a basis for determining whether other CPU cores may continue to execute while handling the SAFE service call or whether all other CPU Cores must be suspended while handling the SAFE service call.

Safe Services

This section discusses several illustrative services provided by SAFE 100. However, this section is not intended to be a comprehensive list of the services which SAFE 100 may provide, as many other types of services are possible and anticipated.

FIG. 2A is a table that illustrates size, offset, and description information for certain exemplary core services provided by SAFE 100 according to an embodiment. The SAFE core services are designed to establish a connection between OS interface driver 186 and SAFE dispatcher 130. In an embodiment, each of these services uses the SCT_SAFE_CORE_SERVICES_GUID as the service GUID. The service parameter buffer may start with the structure listed in row 210 of FIG. 2A to identify the sub-function.

The table of FIG. 2A also depicts the entry service buffer format and the exit service buffer format for the function Initialize( ). The Initialize( ) member sub-function of the SAFE core services establishes the connection between OS interface driver 186 and SAFE dispatcher 130. Initialize( ) validates the caller using the information provided by the service parameter buffer. Initialize( ) updates the session id to be a random number and marks the session as established. If Initialize( ) completes successfully, then it will set the status return value field to SCT_STATUS_SUCCESS. If the session is already started, Initialize( ) will set the status return value field to SCT_STATUS_ALREADY_STARTED. If there is a problem with the validation of the caller, Initialize( ) will set the status return value field to SCT_STATUS_SECURITY_VIOLATION. Note that Initialize( ) may not validate the session id upon entry.

The table of FIG. 2A also depicts the entry service buffer format and the exit service buffer format for the function Shutdown( ). The Shutdown( ) member sub-function of the SAFE core services terminates the connection between OS interface driver 186 and SAFE dispatcher 130. Shutdown( ) marks the session as terminated. If the service completes successfully, then Shutdown( ) will set the status return value field to SCT_STATUS_SUCCESS.

The table of FIG. 2A also depicts the entry service buffer format and the exit service buffer format for the function Query( ). The Query( ) member sub-function of the SAFE core services returns whether or not there has been a SAFE service handler registered for the specified service GUID. If the service completes successfully and a corresponding SAFE service handler has been registered, then Query( ) will set the status return value field to SCT_STATUS_SUCCESS. If there was no SAFE service handler registered for the specified service GUID, then Query( ) will return SCT_STATUS_NOT_FOUND.

FIG. 2B is a table that illustrates size, offset, and description information for certain exemplary SAFE timer services provided by SAFE 100 according to an embodiment. The SAFE timer services are designed to report and configure the expiration of a timer managed by OS interface driver 186. In an embodiment, each of these services uses the SCT_SAFE_TIMER_SERVICES_GUID as the service GUID. The service parameter buffer may start with the structure listed in row 220 of FIG. 2B to identify the sub-function. SAFE dispatcher 130 may use SAFE timer services to provide support for the periodic timer child dispatch protocol (see the PI specification, version 1.2). In an embodiment where SAFE dispatcher 130 does not have any way to tell OS interface driver 186 that the notifications should begin, OS interface driver 186 calls the function Notify( ) periodically with a value of 0 in ElapsedTime to determine if SAFE Dispatcher 130 wishes to begin regular notifications.

The table of FIG. 2B also depicts the entry service buffer format and the exit service buffer format for the function Notify( ). The Notify( ) member sub-function of the SAFE timer services indicates that the specified amount of time has elapsed and then returns the minimum amount of time before the next notification. If the service completes successfully, then Notify( ) will set the status return value field to SCT_STATUS_SUCCESS.

FIG. 2C is a table that illustrates size, offset, and description information for certain exemplary SAFE system state services provided by SAFE 100 according to an embodiment. The SAFE system state services are designed to report system transitions into different sleep states (such as S5) as detected by OS interface driver 186. In an embodiment, each of these services uses the SCT_SAFE_SYS_STATE_SERVICES_GUID as the service GUID. SAFE dispatcher 130 may use SAFE system state services to provide support for the Sx Child Dispatch protocol (see the PI specification, version 1.2). SAFE system state services should be called by OS interface driver 186 as late as possible in the shutdown process of the OS to allow for the possibility that the handler will shut down the system itself. The service parameter buffer may start with the structure listed in row 230 of FIG. 2C to identify the sub-function.

The table of FIG. 2C also depicts the entry service buffer format and the exit service buffer format for the function Notify( ). The Notify( ) member sub-function of the SAFE Sx Services indicates that the system is about to enter the specified state. If the function returns, then the OS will continue its normal process. If the service completes successfully, then Notify( ) will set the status return value field to SCT_STATUS_SUCCESS.

Software SMI Services

SAFE Software SMI Services are designed to report emulated "software SMIs." In an embodiment, each of these services uses the SCT_SAFE_SW_SMI_SERVICES_GUID as the service GUID. The service parameter buffer may start with the following structure to identify the sub-function:

| Name | Size (in bytes) | Offset | Description |
| --- | --- | --- | --- |
| SubFn | 4 | 0 | An unsigned integer that specifies the software SMI value. The value here determines the format of any additional data in service parameter buffer 188 |

SAFE dispatcher 130 may use this sub-function to provide support for the SW SMI Child Dispatch protocol (see the PI specification, version 1.2). There are two types of software SMI emulation that may be provided by OS interface driver 186, namely software invocation and hardware invocation. In software invocation, OS application 182 can perform a SAFE services invocation with the SCT_SAFE_SW_SMI_SERVICES_GUID service GUID and the sub-function in SubFn. In hardware invocation, OS interface driver 186 can register with OS system event dispatcher 184 for notification when a specific interrupt is generated on the platform. The exact interrupt generated is platform specific, but must be able to be generated with a single write to a single I/O or memory location. Preferably, the value written should be able to be retrieved. In this case, OS interface driver 186 will translate this into a SAFE services invocation.

Safe Notification

In an embodiment, OS interface driver 186 can register for notification for various OS events. These notifications generate SAFE service calls with specific GUIDs.

One example of OS event which may require registering for notification is a periodic timer. OS interface driver 186 initially asks OS 180 for a notification after a certain period of time. The returned value indicates the amount of time for the subsequent service call. These SAFE service calls may be dispatched to registration with SAFE command handler 156 responsible for handling Periodic Timer Child Dispatch calls.

One example of an OS event which may require registering for notification is a state transition. OS interface driver 186 asks OS 180 for a notification before transitions to sleep states S0 to S5 and Reset. These SAFE service calls may be dispatched to registered Sx Child Dispatch protocol handlers 152.

Safe Services Invocation (Application)

Figure 3:
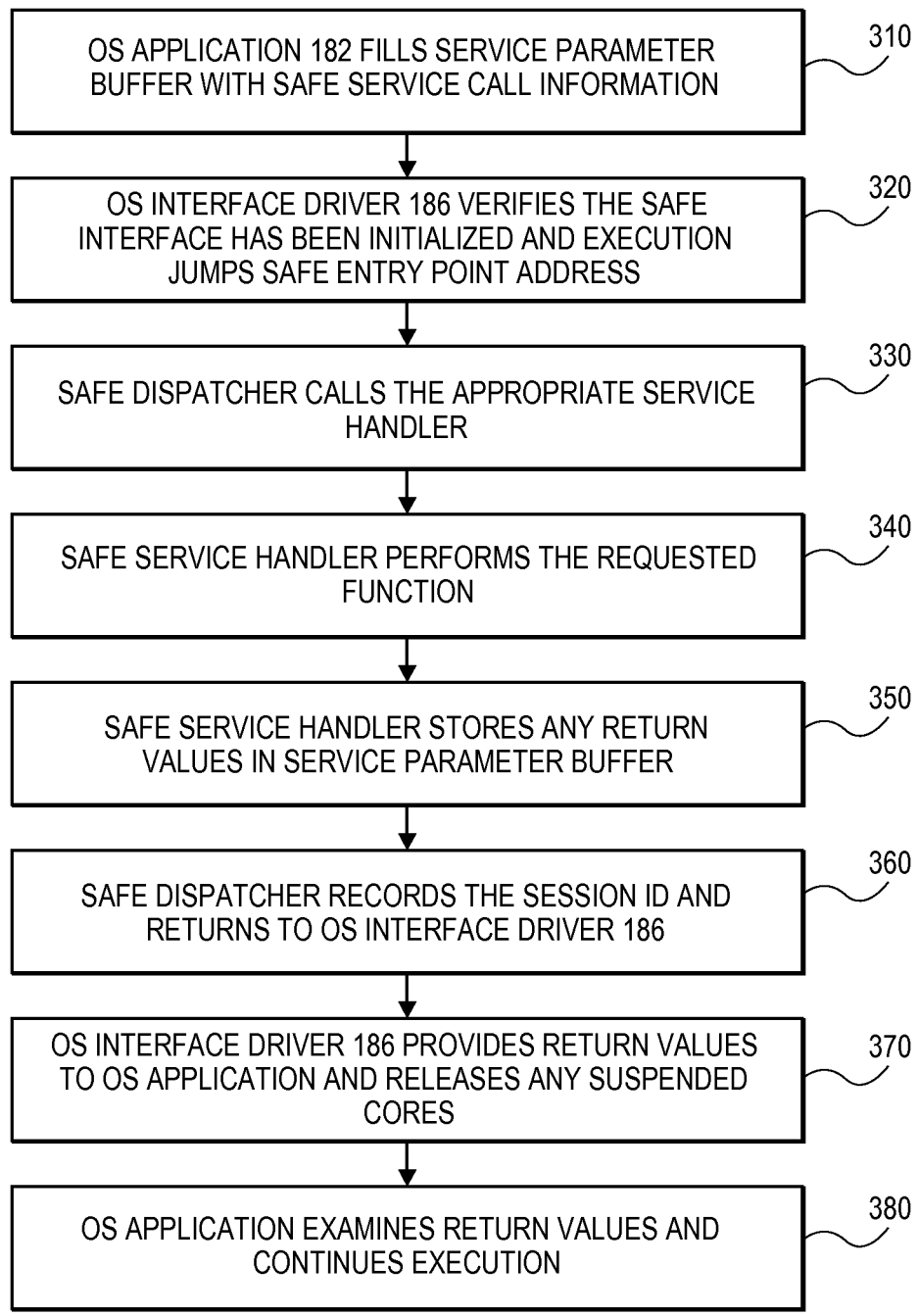
FIG. 3 is a flowchart illustrating the steps for invoking the SAFE services from an OS application according to an embodiment.
Figure 4:
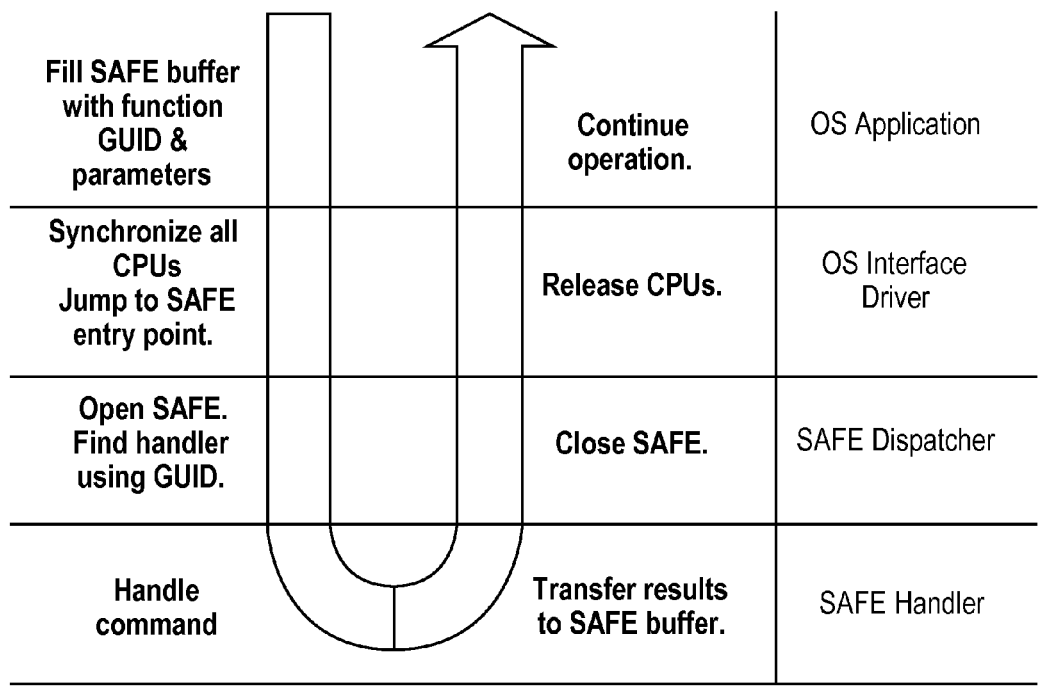
FIG. 4 is a graphical depiction illustrating the steps of FIG. 3 according to an embodiment.

FIG. 3 is a flowchart illustrating the steps for invoking the SAFE services from OS application 182 according to an embodiment. FIG. 4 is a graphical depiction illustrating the steps of FIG. 3 according to an embodiment.

In step 310, OS application 182 stores, in service parameter buffer 188, service parameters, including the service GUID, for the SAFE service call. Thereafter, OS application 182 calls the interface function provided by the OS interface driver 186. Alternatively, this information may be dispatched via the SW SMI Child Dispatch protocol using a software SMI command port value.

In step 320, OS interface driver 186 verifies that the SAFE interface has been initialized. If another thread is currently executing a SAFE service call, then the present SAFE service call is deferred until the other thread exits. Then, processing of the SAFE service call enters the MP-safe critical section, and, depending on the 'Synchronize CPU Cores' attribute of the SAFE Service call, optionally all other CPU cores will be suspended. OS interface driver 186 should be executing at a privilege level to provide OS interface driver 186 access to memory and I/O resources. OS interface driver 186 copies the SAFE service GUID and service parameters for this SAFE service call from service parameter buffer 188 into SAFE communication buffer 160. OS interface driver 186 then copies the session id from the previous call into the SAFE communication buffer 160 and increments the session id. Thereafter, execution jumps to the address specified by SAFE entry point 120.

In step 330, SAFE dispatcher 130, if necessary, opens up the SAFE environment, verifies that the session id stored in communication buffer 160 is correct, determines which SAFE service handlers 150-158 should handle the service GUID specified in SAFE communication buffer 160, and calls the appropriate SAFE service handler 150-158.

In environments where there is hardware protection for the SAFE environment (e.g., a memory normally hidden is now exposed, external interrupts are disabled, and/or CPU cores are synchronized), there may be steps required to enable or "open" the SAFE environment. An analogous action on x86 platforms is the writing of a particular value to an I/O port, which initiates the transition to SMM mode.

In step 340, the appropriate SAFE service handler (i.e., the SAFE service handler called in step 330) validates all parameters and performs the requested function.

In step 350, the appropriate SAFE service handler stores any return values in service parameter buffer 188.

In step 360, SAFE dispatcher 130 records the session Id, closes the SAFE environment, and returns to OS interface driver 186.

In step 370, OS interface driver 186 provides any return values from the processing of the SAFE service call to the buffer of OS application 182, releases any suspended cores, and exits the critical section.

In step 380, OS application 182 examines any return values and continues execution.

Safe Notification Invocation (OS Event)

Figure 5:
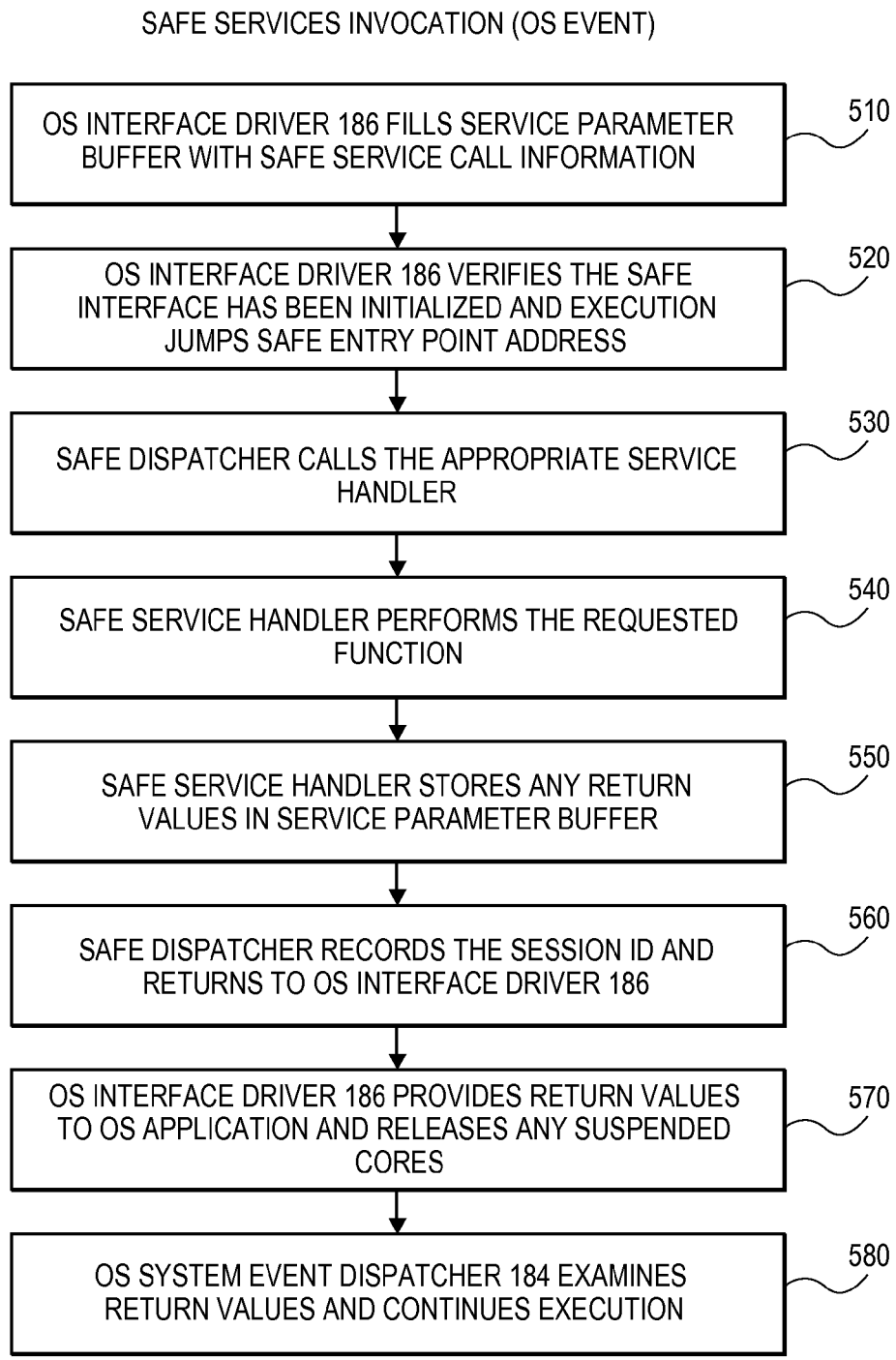
FIG. 5 is a flowchart illustrating the step of invoking the SAFE services as a result of an OS event according to an embodiment.

FIG. 5 is a flowchart illustrating the step of invoking the SAFE services as a result of an OS event according to an embodiment. OS interface driver 186 may also act to notify the system firmware of certain system events by using OS related services. In x86 systems, it is typical for the SMM environment to be invoked as a result of hardware monitoring such events. Since the ARM platforms typically do not have hardware capable of monitoring system events, a cooperative effort between OS interface driver 186 and the system firmware provides similar behavior. The primary difference between SAFE notification invocations and SAFE services invocations discussed above is that OS interface driver 186 is the originator, rather than OS application 182.

In step 510, OS system event dispatcher 184 detects a significant event for which OS interface driver 186 registered a handler. As a result, OS system event dispatcher 184 passes control to the handler registered by OS interface driver 186. OS interface driver 186 receives control from the operating system at the time when it detects one of the various events (such as a timer or emulated software SMI) which would initiate a transition into SMM. Each event type may have a corresponding service GUID and service parameter structure. Note that in those ARM platforms which do not support hardware based events that initiate a transition into SMM, OS interface driver 186 may simulate them by (a) registering with the operating system for notification when a non-SMM-initiating event occurs (e.g., a timer interrupt) and then (b) calling SAFE entry point 120 with the SAFE communication buffer filled in with the appropriate GUID and data. Thereafter, OS interface driver 186 invokes a SAFE service call by storing service parameters, including the service GUID, for the SAFE service call in service parameter buffer 188.

In step 520, OS interface driver 186 verifies that the SAFE interface has been initialized. If another thread is currently executing a SAFE service call, then the present SAFE service call is deferred until the other thread exits. Then, processing of the SAFE service call enters the MP-safe critical section, and, depending on the 'Synchronize CPU Cores' attribute of the SAFE service call, optionally all other CPU cores will be suspended. OS interface driver 186 should be executing at a privilege level to provide OS interface driver 186 access to memory and I/O resources. OS interface driver 186 copies the SAFE service GUID and the service parameters for this SAFE service call into from service parameter buffer 188 into SAFE communication buffer 160. OS interface driver 186 then copies the session id from the previous call into the SAFE communication buffer 160 and increments the session id. Then execution jumps to the address specified by SAFE entry point 120.

In step 530, SAFE dispatcher 130, if necessary, opens up the SAFE environment, verifies that the session id stored in communication buffer 160 is correct, determines which SAFE service handlers 150-158 should handle the service GUID specified in communication buffer 160, and calls the appropriate SAFE service handler 150-158.

In step 540, the appropriate SAFE service handler (called in step 530) validates all parameters and performs the requested function.

In step 550, appropriate SAFE service handler stores any return values in service parameter buffer 188.

In step 560, SAFE dispatcher 130 records the session id, closes the SAFE environment, and returns to OS interface driver 186.

In step 570, OS interface driver 186 performs any necessary house-keeping tasks associated with the notification.

In step 580, OS system event dispatcher 184 examines any return values and continues execution.

Alternate Embodiments

Alternate embodiments of this invention can enhance the security of SAFE 100. For example, SAFE entry point 120 may be located in non-volatile memory. As another example, an embodiment may allow a separate memory space to be opened when accessed from a pre-defined memory range. Additionally, the CPU could be augmented to generate a higher priority interrupt where the vector is set and locked by firmware. In other words, the address that is jumped to as a result of processing the interrupt would be identified by the firmware in a way that prevents the address from being subsequently modified. This interrupt would be used by OS interface driver 186 without fear that the address associated with the interrupt could be redirected to identify malicious code.

In ARM7 processors, a new feature known as TrustZone is available which provides similar hardware protection capabilities to those provided by SMM mode on x86 processor. The only standard way of entering this execution mode is through a software instruction (SMC) and a sub-function code. ARM Ltd., the provider of the ARM7 processor, has described a series of APIs (called the TrustZone API) which are meant to provide certain standard capabilities to ARM platforms that support the TrustZone hardware protection features of the ARM7 processor. While packaged together, the API and the hardware capabilities are logically separate. In ARM terminology, the core code which manages the TrustZone environment is called the "monitor."

There are several models whereby SAFE 100 will work with the TrustZone feature provided by ARM7 processors. In those cases where the "monitor" is provided by a $3^{rd}$ party (such as an ARM processor vendor), SAFE 100 may run as a client of the monitor. During the initialization stages of the firmware, when the TrustZone environment is being initialized, the monitor is instantiated and SAFE 100 may be instantiated as a client of the monitor, usually by registering for notification of a specific SMC sub-function. The notification may be a call into SAFE dispatcher 130. The means used to register and the means of instantiation may vary from monitor to monitor since the mechanism is not standardized. In these cases, the call from OS interface driver 186 to SAFE entry point 120 would then, in turn, use the SMC instruction with the registered sub-function to initiate SAFE functionality. The SMC instruction would initiate entry into the TrustZone environment, the monitor would detect the sub-function code used and, in turn, hand control to SAFE dispatcher 130.

In those cases where the monitor is not provided by a $3^{rd}$ party, SAFE 100 may run as the monitor. In such embodiments, upon entry, SAFE dispatcher 130 would save the running state of the CPU (as described in the PI specification), perform its tasks, and then restore the running state of the CPU, prior to returning. The SMC instruction would also be used to initiate entry into the TrustZone environment as above.

According to one embodiment, the SMC sub-function code may be used to emulate the "software SMI" functionality of the SMM infrastructure described by the UEFI PI specification. In another embodiment, only a single SMC sub-function code is used and "software SMI" functionality is handled only via the software SMI notification. In this case, the TrustZone APIs, if provided, may be a standard UEFI PI SMM driver which handles the specific sub-function codes used for the TrustZone APIs.

While the TrustZone environment does provide for the concept of "timers" and other hardware events which might initiate entry into the TrustZone environment, these events are not currently standardized. As such, it is envisioned that some mixture of emulated events (using OS interface driver 186) and special TrustZone-initiating events may be used on platforms going forward. That is, a platform might use special timer hardware which initiates the TrustZone environment, but also might provide certain other hardware events (i.e. power-state transitions) through OS notifications.

Figure 7:
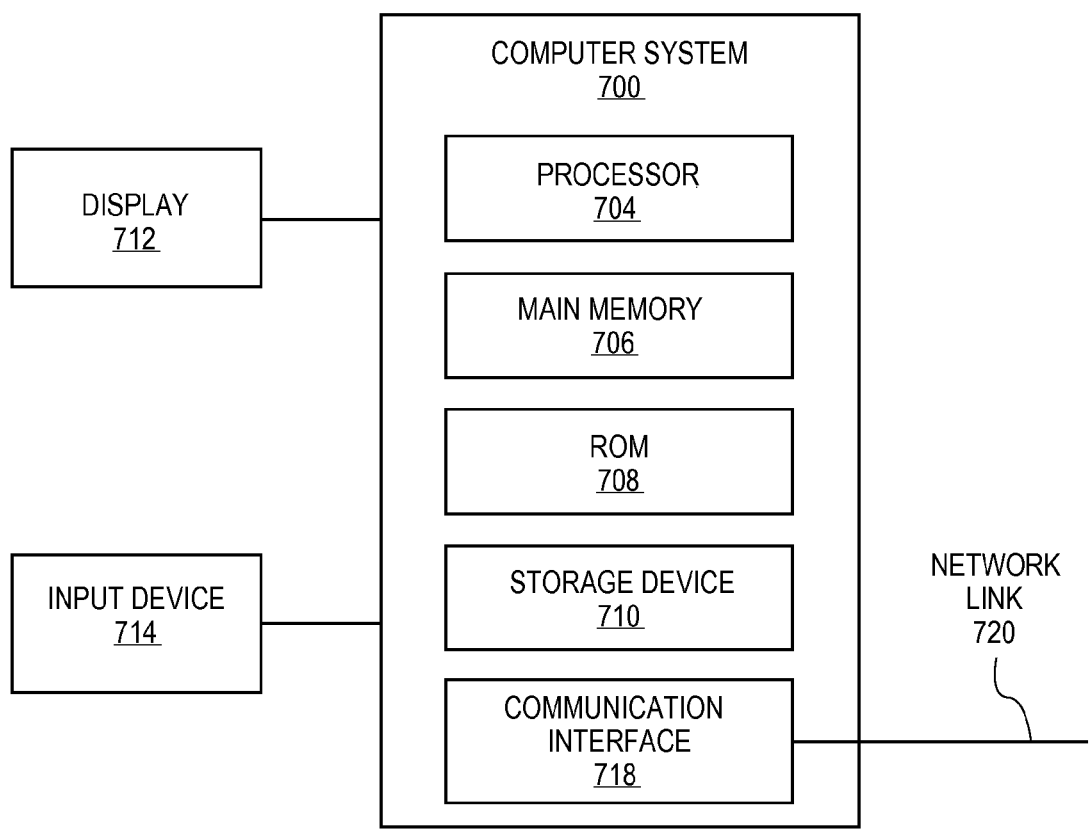
FIG. 7 is a block diagram that illustrates a computer system upon which an embodiment of the invention may be implemented.

In an embodiment, SAFE 100 may be implemented on a computer system. FIG. 7 is a block diagram that illustrates a computer system 700 upon which an embodiment of the invention may be implemented. In an embodiment, computer system 700 includes processor 704, main memory 706, ROM 708, storage device 710, and communication interface 718.

Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for providing firmware services, comprising:
   firmware providing a simulated system management mode (SMM) while being executed by two or more physical ARM processors by performing:
   in response to receiving a service call from an OS interface driver, determining a requested service identified by the service call,
   wherein the service call contains an attribute used to determine whether all but one physical processing core should be suspended when processing the service call;
   the OS interface driver suspends all but one processing physical core when issuing the service call, wherein one or more physical processing cores are suspended by the OS interface driver;
   identifying an appropriate service handler to perform the requested service;
   after the appropriate service handler performs the requested service, the appropriate service handler notifying the OS interface driver; and
   in response to the OS interface driver receiving the notification, the OS interface driver releasing any suspended physical processing cores, wherein said any suspended physical processing cores includes at least one physical processing core.

2. The method of claim 1, wherein determining is performed by a SAFE dispatcher using a unique identifier associated with the service call.

3. The method of claim 1, wherein identifying is performed by a SAFE dispatcher, and wherein the appropriate service handler is selected by the SAFE dispatcher from a plurality of service handlers registered with the SAFE dispatcher.

4. The method of claim 1, wherein the OS interface driver makes the service call using an entry point address exposed by an ACPI table.

5. The method of claim 1, wherein the OS interface driver issues the service call in response to a communication received from an OS application.

6. The method of claim 1, wherein the OS interface driver issues the service call in response to a communication received from an OS system event dispatcher.

7. The method of claim 1, wherein the service call involves a timer managed by the OS interface driver.

8. The method of claim 1, wherein the service call involves a transition to a different sleep state.

9. The method of claim 1, wherein source code for the firmware is capable of executing on an x86 platform without modification.

10. The method of claim 1, wherein the one or more processors are each a ARM7 processor, and wherein the simulated system management mode (SMM) operates as a client of a monitor component that manages a TrustZone environment provided by the one or more processors.

11. The method of claim 1, wherein the one or more processors are each a ARM7 processor, and wherein the simulated system management mode (SMM) operates as a monitor component that manages a TrustZone environment provided by the one or more processors.

12. A non-transitory machine-readable storage medium storing one or more sequences of instructions, which when executed by one or more processors, causes:
firmware providing a simulated system management mode (SMM) while being executed by two or more physical ARM processors by performing:
in response to receiving a service call from an OS interface driver, determining a requested service identified by the service call,
wherein the service call contains an attribute used to determine whether all but one physical processing core should be suspended when processing the service call;
the OS interface driver suspending all but one processing physical core when issuing the service call, wherein one or more physical processing cores are suspended by the OS interface driver;
identifying an appropriate service handler to perform the requested service;
after the appropriate service handler performs the requested service, the appropriate service handler notifying the OS interface driver; and
in response to the OS interface driver receiving the notification, the OS interface driver releasing any suspended physical processing cores, wherein said any suspended physical processing cores includes at least one physical processing core.

13. The non-transitory machine-readable storage medium of claim 12, wherein identifying is performed by a SAFE dispatcher, and wherein the appropriate service handler is selected by the SAFE dispatcher from a plurality of service handlers registered with the SAFE dispatcher.

14. The non-transitory machine-readable storage medium of claim 12, wherein the OS interface driver makes the service call using an entry point address exposed by an ACPI table.

15. The non-transitory machine-readable storage medium of claim 12, wherein the OS interface driver issues the service call in response to a communication received from an OS application.

16. The non-transitory machine-readable storage medium of claim 12, wherein the OS interface driver issues the service call in response to a communication received from an OS system event dispatcher.

17. The non-transitory machine-readable storage medium of claim 12, wherein source code for the firmware is capable of executing on an x86 platform without modification.

* * * * *